United States Patent

[11] 3,583,226

| [72] | Inventor | Jorge G. Codina<br>Hartsdale, N.Y. |
|---|---|---|
| [21] | Appl. No. | 522,677 |
| [22] | Filed | Jan. 24, 1966 |
| [45] | Patented | June 8, 1971 |
| [73] | Assignee | Gravimetrics, Incorporated<br>Washington, D.C. |

[54] GRAVIMETER
9 Claims, 1 Drawing Fig.

[52] U.S. Cl............................................. 73/382,
    73/517
[51] Int. Cl............................................. G01r 7/04
[50] Field of Search........................................ 73/382,
    517—520; 74/5, 46, 5.6, 5.8

[56] References Cited
UNITED STATES PATENTS
2,919,583  1/1960  Parker........................... 74/5

| 2,942,479 | 6/1960 | Hollmann..................... | 74/5.6 |
| 3,060,750 | 10/1962 | Morgan........................ | 73/517 |
| 2,675,222 | 4/1954 | Clark............................ | 73/382X |
| 2,691,306 | 10/1954 | Beams et al................... | 73/382X |

*Primary Examiner*—James J. Gill
*Attorney*—Theodore Jay, Jr.

ABSTRACT: A gravimeter employs a levitational magnetic field to suspend a magnetic body which is counterbalanced by the upward pull of the field and the downward pull of the gravitational force. As the force changes, the body moves incrementally up or down. An electrical feedback signal is used to restore the body to its original position. The signal thus increases or decreases with increases or decreases in the gravitational force and provides a means for obtaining a direct reading of the changes in the force as well as the rate at which the force is changing.

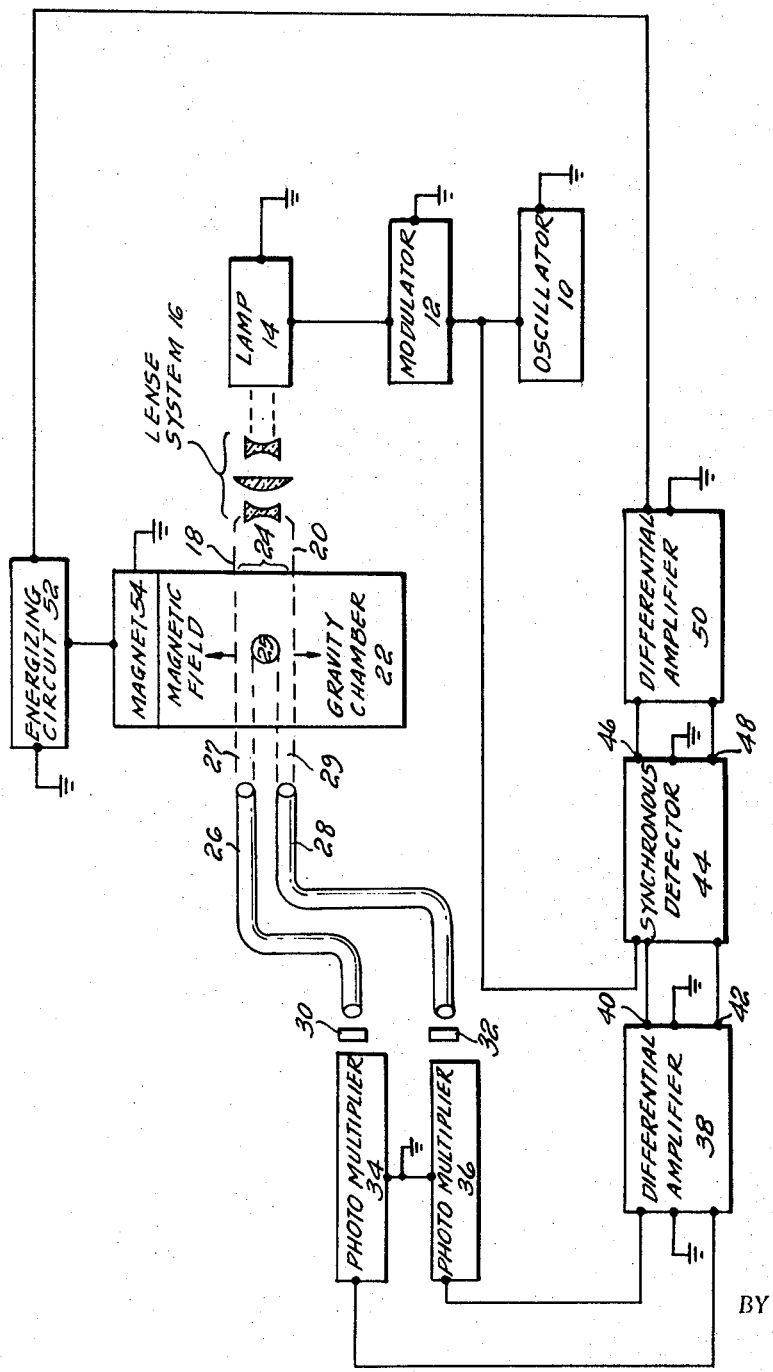

GRAVIMETER

My invention is directed toward gravimeters. Gravimeters, as is known to the art, are used to measure the value, or variations in value, of the force of gravity from place to place above, below or on the surface of the earth or other celestial body.

I have invented a new type of gravimeter functioning on new principles which is characterized by much higher sensitivity and accuracy than heretofor obtainable. My gravimeter can be used to measure absolute or relative values of the force of gravity. Moreover, my gravimeter can have a much faster rate of response to changes in the force of gravity and can produce a measurement of gravitational force much more rapidly than any of the various known types of gravimeters. My gravimeter can be extremely small, compact and light in weight; it can be easily and rapidly moved from place to place; it utilizes only one movable part which is virtually indestructible; it requires little or no adjustment during and after use and is easily calibrated.

In accordance with the principles of my invention, my gravimeter comprises an electromagnet adapted to produce a levitational magnetic field directed downward therefrom. First means is coupled to the electromagnet to energize same. The first means is responsive to a variable feedback signal to vary the intensity of the levitational magnetic field. The field intensity varies monotonically with variations of the feedback signal, increasing when the feedback signal increases, and decreasing when the feedback signal decreases.

A magnetic body is positioned below the electromagnet, being simultaneously subject to the upward lift of the levitational magnetic field and the downward pull of the oppositely directed gravitational force.

Body indication means, rendered responsive when the body is positioned within a predetermined vertical control zone spaced apart from and positioned below the electromagnet, generates an output signal varying with changes of the vertical position of the body within the zone. These changes are produced by changes of the gravitational force with respect to the gravimeter.

Second means coupled between the indication means and the first means obtains the feedback signal from the output signal. The feedback signal is supplied to the first means to control the intensity of the levitational magnetic field. The feedback signal produces an increase in the field intensity when the gravitational force increases, and produces a decrease in the field intensity when the gravitational force decreases; the effect of these variations is to prevent the body from moving upward or downward out of the zone.

Since the field intensity increases or decreases as the gravitational force increases or decreases in order to maintain the body in the zone (i.e., the levitational force of the field must always be approximately equal to the oppositely directed gravitational force), the field intensity is a monotonic function of the gravitational force. Hence, readout means can convert the intensity to a direct reading of the gravitational force. Moreover, since the feedback signal must increase or decrease with increases or decreases in the gravitational force, the feedback signal is also a monotonic function of the gravitational force; readout means can derive from the feedback signal a direct reading of the changes in gravitational force as well as indicate the rate at which this force is changing.

An illustrative embodiment of my invention will now be described with reference to the accompanying FIGURE which is a block diagram of one embodiment of my invention.

Referring now to the FIGURE, an oscillator 10 produces an oscillatory signal of constant frequency. This signal is supplied to the input of modulator 12 which actually functions as a chopper to interrupt the signal at a constant rate. The interrupted signal is then supplied to a light source 14 of narrow bandwidth (which can be substantially or actually monochromatic) whereby pulsating light is emitted from the source. This pulsating light impinges upon a lens system 16 which converts the incident light into a thin ribbon-shaped beam of light lying in a vertical plane and having upper and lower horizontal edges 18 and 20. This beam passes horizontally through a transparent vertical vacuum chamber 22 whereby the upper and lower edges respectively define the upper and lower bounds of a vertical control zone 24 within the chamber. A magnetic sphere 25 is positioned in the chamber in the path of the beam as described in more detail hereinafter. As the beam strikes the sphere, the beam is split into two beams of variable width, the first means 27 having an upper horizontal edge 18 and a lower horizontal edge coincident with the top of the sphere, the second beam 29 having an upper horizontal edge coincident with the bottom of the sphere and a lower horizontal edge 20. Each of these beams impinges upon one end of a corresponding flexible light pipe or conduit 26 or 28. (The conduits constitute a fiber optics system).

After each of the beams 27 or 29 has passed through the other end of the corresponding conduit 26 or 28, it passes through a corresponding one of two identical narrow band optical filters 30 or 32 (matched with the bandwidth of the light beams) and impinges upon a corresponding one of two matched photomultipliers 34 or 36, whereby a separate electrical signal is produced at the output of each photomultiplier. Since each light beam is modulated, each photomultiplier output signal is an alternating signal. These two photomultiplier signals are fed to the input of an alternating current differential amplifier 38. As a result, an alternating differential signal appears between the output terminals 40 and 42 of amplifier 38. A synchronous detector 44 is connected at a first input to terminals 40 and 42 to receive the alternating differential signal and is also connected at a second input to the output of oscillator 10 to receive the oscillatory signal. The resultant detector signal produced across output terminals 46 and 48 of detector 44 is supplied to the input of a direct current differential amplifier 50. The resultant signal appearing at the output of amplifier 50 is supplied to the input of energizing circuit 52. The output of circuit 52 is fed to electromagnet 54 positioned on top of chamber 22. Electromagnet 54 produces a levitational magnetic field which extends downwardly into the chamber 22 past zone 24. This field exerts a levitational action on sphere 25 which counterbalances the downward pulls of the oppositely directed gravitational force on the sphere whereby the sphere is held with zone 24.

The operation of the embodiment of my invention shown in the FIGURE is as follows.

For the purposes of clarity, the conventional power supply as well as the conventional connections between the supply and the various components shown in the FIGURE have been omitted and will not be referred to herein.

The amplitude of each photomultiplier output signal is dependent upon the width (as measured in the vertical plane) of the corresponding beam which strikes the corresponding photomultiplier. When the sphere is in the center of the control zone, the widths of both beams 27 and 29 are identical; consequently when the photomultipliers 34 and 36 are exactly matched, the two corresponding photomultiplier output signals are identical, the alternating differential signals (which represents the difference between the two photomultiplier output signals) is zero. Further, when the alternating differential signal is zero, the detector signal is also zero and as a result the feedback signal is zero. In order to prevent the sphere from falling out of the center position under these conditions, circuit 52 can be designed to supply a constant energizing current (in the absence of a feedback signal) to the electromagnet in order to produce a levitational field just sufficient to hold the sphere in the center against the force of gravity.

However, as this force increases with respect to the gravimeter the sphere is pulled downward since the force of gravity now slightly exceeds the oppositely directed force produced by the field. At this point, the width of beam 27 is increased and the width of beam 29 is decreased. The resultant inequality of photomultiplier output signals produces an alternating difference signal having an instantaneous magnitude determined by the relative beam widths. This signals, after detection, yields a detected signal of a given polarity. This detector signal is amplified as a direct feedback current which is fed to the energizing current circuit to increase the energizing current and thus increase the strength of the field thereby restoring the sphere to its original position.

Similarly if the force of gravity decreases with respect to the gravimeter, the sphere is pulled upward, since the levitational force now slightly exceeds the gravitational force. At this point, the width of beam 27 is decreased and the width of beam 29 increased. An alternating difference signal is produced as before. This signal after detection yields a detected signal of reversed polarity. The resultant direct feedback current then causes a decrease in the energizing current, decreasing the field strength thereby again restoring the sphere to its original position.

Both the constant current required to originally adjust the gravimeter to center the sphere and the field produced by the electromagnet each represent the absolute force of gravity and a suitably calibrated current or field-sensitive device can be used to provide a direct readout of this force of gravity. A recorder can be connected to this device to provide a suitable record. Similarly, the changes in the current producing the field when supplied to such a readout device properly calibrated, can be used to produce readings representing the changes of gravitational force. Note that changes in the force of gravity can be indicated in relative terms; i.e., it is not necessary to know the absolute value of the force of gravity to be able to indicate variations therein.

Alternatively, the two photomultipliers can be deliberately unbalanced, as for example through the use of conventional biasing techniques, to produce a difference signal which increases or decreases from a null but not zero baling thus eliminating the need for the energizing circuit to produce a constant exciting current in the absence of a difference signal.

In order to obtain maximum sensitivity, accuracy and speed of response, my gravimeter requires an evacuated chamber. The presence of air produces undesirable errors because of temperature changes, buoyancy, damping and the like.

However, my gravimeter will operate in the same manner as previously described in the presence of air provided that the resultant decreases in sensitivity, accuracy and speed of response of the gravimeter can be tolerated by the user. In some situations, these decreases are not important and, the gravimeter then can be simplified by omitting the otherwise necessary vacuum producing and controlling apparatus.

While I have described my invention with particular reference to the drawings, many variations and modifications within the scope and sphere of my invention will be obvious to those skilled in the art, and my protection is to be limited only by the terms of the claims which follow.

What I claim is:
1. A gravimeter comprising:
   a. an electromagnet adapted to produce a levitational magnetic field directed downward therefrom;
   b. first means coupled to said electromagnet to energize same and being responsive to a variable feedback signal to vary the magnetic field intensity, the intensity varying monotonically with variations of said feedback signal;
   c. an evacuated chamber;
   d. a magnetic body positioned below said magnet and being subject both to the levitational force of said field and an oppositely directed gravitational force, said body being disposed in said chamber;
   e. body position indication means rendered responsive when said body is positioned within a predetermined vertical zone spaced apart from and positioned below said electromagnet to generate an output signal varying with upward and downward changes of vertical position of said body within said zone produced by changes of said gravitational force with respect to the gravimeter, said indication means including a device for producing a ribbon of light lying in a vertical plane, the upper and lower edges of this ribbon respectively defining the upper and lower bounds of said vertical zone, said device including a light source of narrow bandwidth disposed on one side of said body, means coupled to said source to modulate the light intensity thereof, a lens system disposed between said source and said body to derive said light ribbon from said source, an electro-optical transducer disposed on the other side of said body in the path of said light ribbon to produce a position signal which varies as the position of said body with respect to said beam varies and demodulator means coupled to said transducer to obtain the output signal from the position signal;
   f. second means coupled between said indicating means and said first means to obtain said feedback signal from said output signal and to supply said feedback signal to said first means, said feedback signal increasing said field intensity when said gravitational force increases and decreasing said field intensity when said gravitational force decreases to prevent said body from escaping from said zone, the magnetic field intensity being a monotonic function of the gravitational force; and
   g. third means responsive to said output signal to obtain therefrom a measure of said gravitational force.

2. A gravimeter as set forth in claim 1 wherein said demodulator means includes a synchronous detector.

3. A gravimeter as set forth in claim 2 wherein said body is a sphere.

4. A gravimeter as set forth in claim 3 wherein said transducer includes a pair of flexible light conduits and a pair of photomultipliers, each conduit extending between the corresponding photomultiplier and said sphere, said sphere splitting said light ribbon into upper and lower ribbon beams of light, each ribbon beam impinging through a corresponding conduit into a corresponding photomultiplier.

5. A gravimeter as set forth in claim 4 wherein said device includes a narrow bandwidth filter matched with the characteristics of the modulated source and interposed between said conduits and said photomultipliers.

6. A gravimeter as set forth in claim 5 wherein said device includes a high-gain alternating current differential amplifier interposed between said photomultipliers and said synchronous detector.

7. A gravimeter as set forth in claim 6 wherein the output of said detector is a direct current output signal.

8. A gravimeter as set forth in claim 7 wherein said second means yields a direct current feedback signal, said second means including a high-gain direct current amplifier responsive to said output signal to derive said feedback signal therefrom.

9. A gravimeter as set forth in claim 8 wherein said modulation means includes an oscillator coupled to said detector whereby said detector and oscillator are synchronized.